United States Patent

[11] 3,630,105

| [72] | Inventor | George William Rider<br>Harrisburg, Pa. |
|---|---|---|
| [21] | Appl. No. | 37,717 |
| [22] | Filed | May 15, 1970 |
| [45] | Patented | Dec. 28, 1971 |
| [73] | Assignee | AMP Incorporated<br>Harrisburg, Pa. |

[54] WIRE-STRIPPING MACHINE
9 Claims, 15 Drawing Figs.

[52] U.S. Cl........................................................ 81/9.51, 82/20
[51] Int. Cl........................................................ H02g 1/12
[50] Field of Search............................................ 81/9.51; 82/20, 70.2, 61, 64, 65; 30/90.1, 91.2

[56] References Cited
UNITED STATES PATENTS
1,433,320  10/1922  Wersel .................. 81/9.51
2,401,149  5/1946  Gordon .................. 81/9.51
2,239,755  4/1941  Montgomery .......... 81/9.51

*Primary Examiner*—James L. Jones, Jr.
*Attorneys*—Curtis, Morris and Safford, William J. Keating, Ronald D. Grefe, William Hintze, Adrian J. La Rue, Frederick W. Raring, Jay L. Seitchik and John P. Vandenburg

ABSTRACT: A wire-stripping machine has an improved iris-type blade assembly which is continuously rotating. A wire to be stripped is inserted in the iris which is then closed to cut the insulation. When the wire is withdrawn the end of the insulation is stripped. The four cutter blades each have two apertures. Four blade holders have projections which engage an aperture in two blades. The blade holders are driven in slots in a cap radial to the axis of rotation of the assembly. By driving the blade holders inwardly and outwardly in the slots the iris formed by the blades is closed into cutting engagement with the wire to be stripped.

WIRE-STRIPPING MACHINE

BACKGROUND OF THE INVENTION

This invention relates to wire-stripping machines and more particularly to a wire-stripping machine which has a continuously rotating assembly of blades which close into cutting engagement with the insulation of the wire to be stripped.

U.S. Pat. Nos. 2,239,755—Montgomery, and 2,401,149—Gordon show examples of wiring stripping machines. The Montgomery patent shows a machine in which a rotating assembly has blades which close into cutting engagement with the insulation of a wire inserted therein. When the wire is pulled out of the assembly the insulation is stripped from the end of the wire. Some of the stringent operating requirements of machines of this type are that they have reliable mechanisms for adjusting the cutting diameter to accommodate different diameters of wires, that they have an adjustment for setting the length of the insulation to be stripped from the end of the wire, and that they have means for disposing of the slug of insulation cut from the wire.

SUMMARY OF THE INVENTION

In accordance with an important aspect of this invention, an improved iris-type blade assembly includes blade holders driven inwardly and outwardly in radial slots in a cap to open and close the iris formed by the blades.

In accordance with another aspect of this invention the blade holders are driven in the slots by operating levers which have a cam follower on one end which rides up on a cam member moved longitudinally along the main drive shaft of the assembly.

In accordance with another aspect of the invention the cutting diameter of the blade assembly is adjusted by an adjustable stop which limits the longitudinal movement of the cam member along the main shaft.

In accordance with another aspect of this invention a spring-loaded plunger is mounted in the bore of the main shaft. The wire to be stripped is inserted through the rotating blade assembly at the opening of the bore. After the wire has been withdrawn to strip the insulation from the end thereof, the spring-loaded plunger is released to expel the slug of cutoff insulation from the machine.

In accordance with another aspect of this invention the position of the plunger in the bore is varied to adjust the length of insulation to be cut from the wire.

The foregoing and other objects, features and advantages of the invention will be better understood from the following more detailed description and appended claims.

DESCRIPTION OF A PARTICULAR EMBODIMENT

Figure 1:
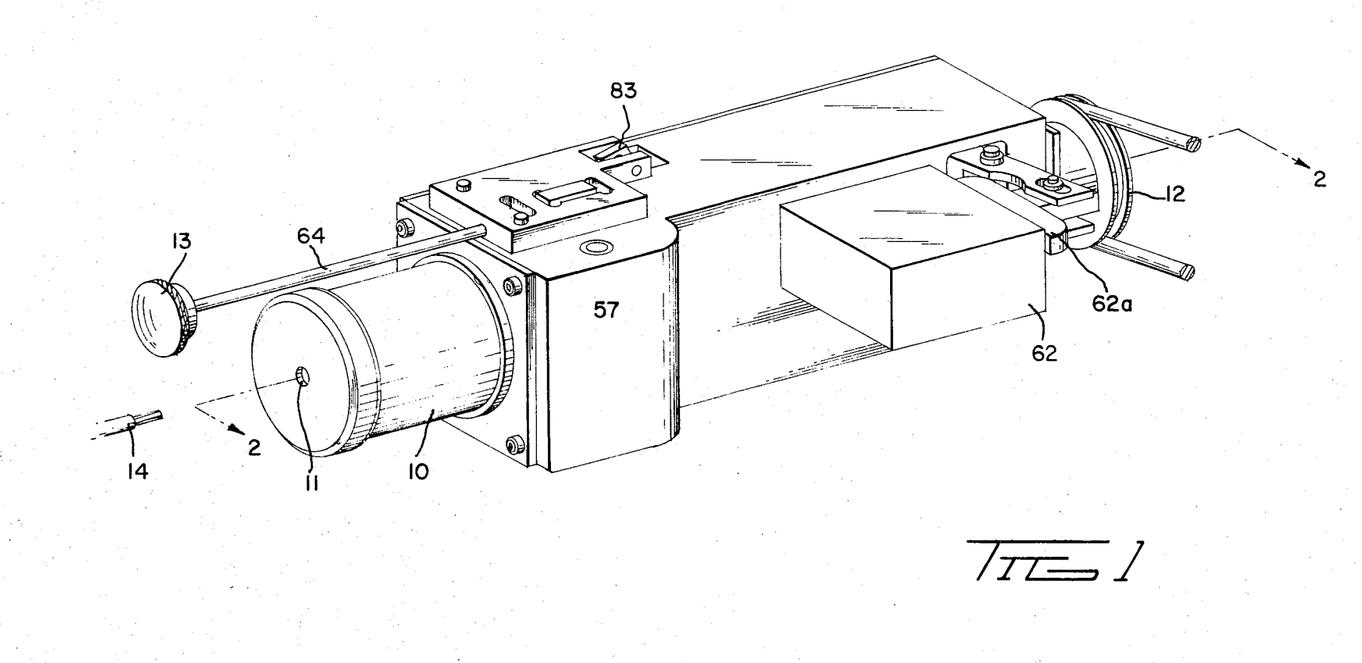
FIG. 1 is a diagrammatic perspective view illustrating the mechanism of the invention.

FIG. 1 shows the outward appearance of the machine. It includes the casing 10 enclosing the rotating blade assembly. The wire to be stripped is inserted through an aperture 11 in the casing 10. The rotating assembly is driven by an electric motor (not shown) through the drive pulley 12. An adjusting knob 13 is adjusted for the diameter of the wire 14 to be stripped.

Figure 2A:
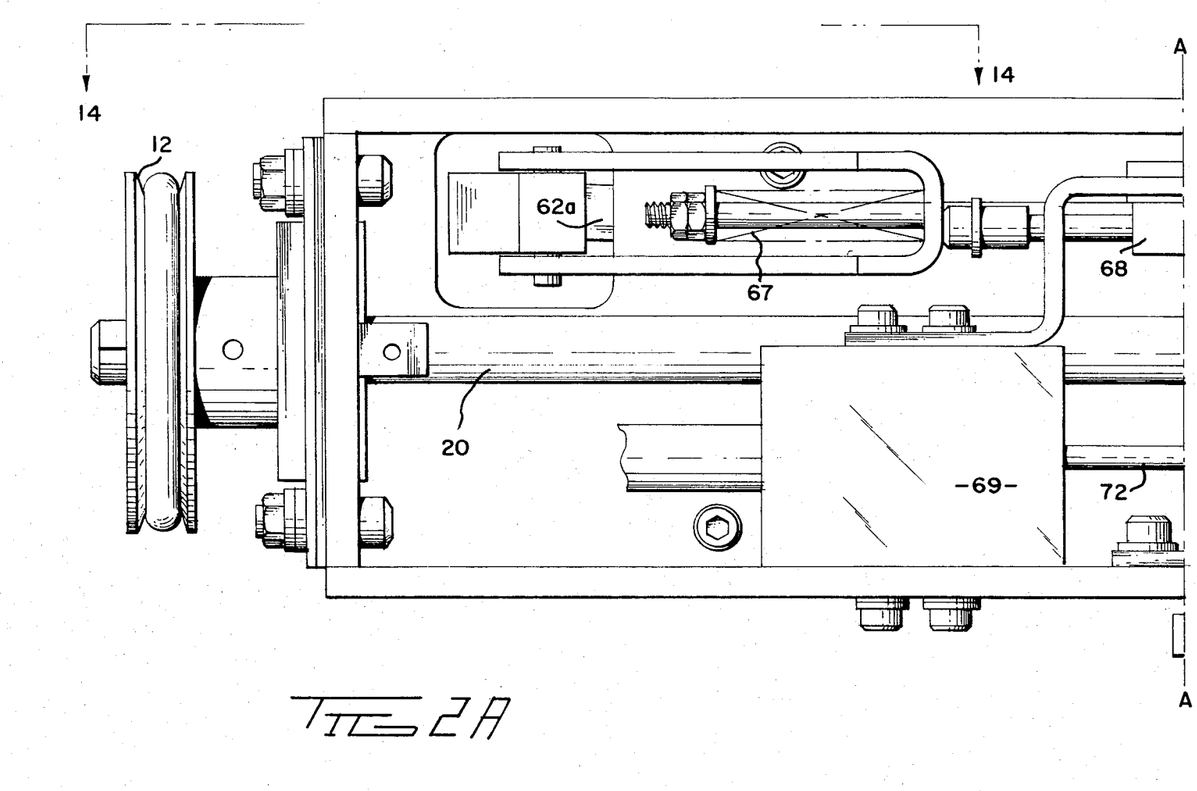
FIGS. 2A and 2B combine to form a longitudinal sectional view as taken along the lines 2—2 of FIG. 1, showing the mechanism in its relaxed condition.
Figure 2B:
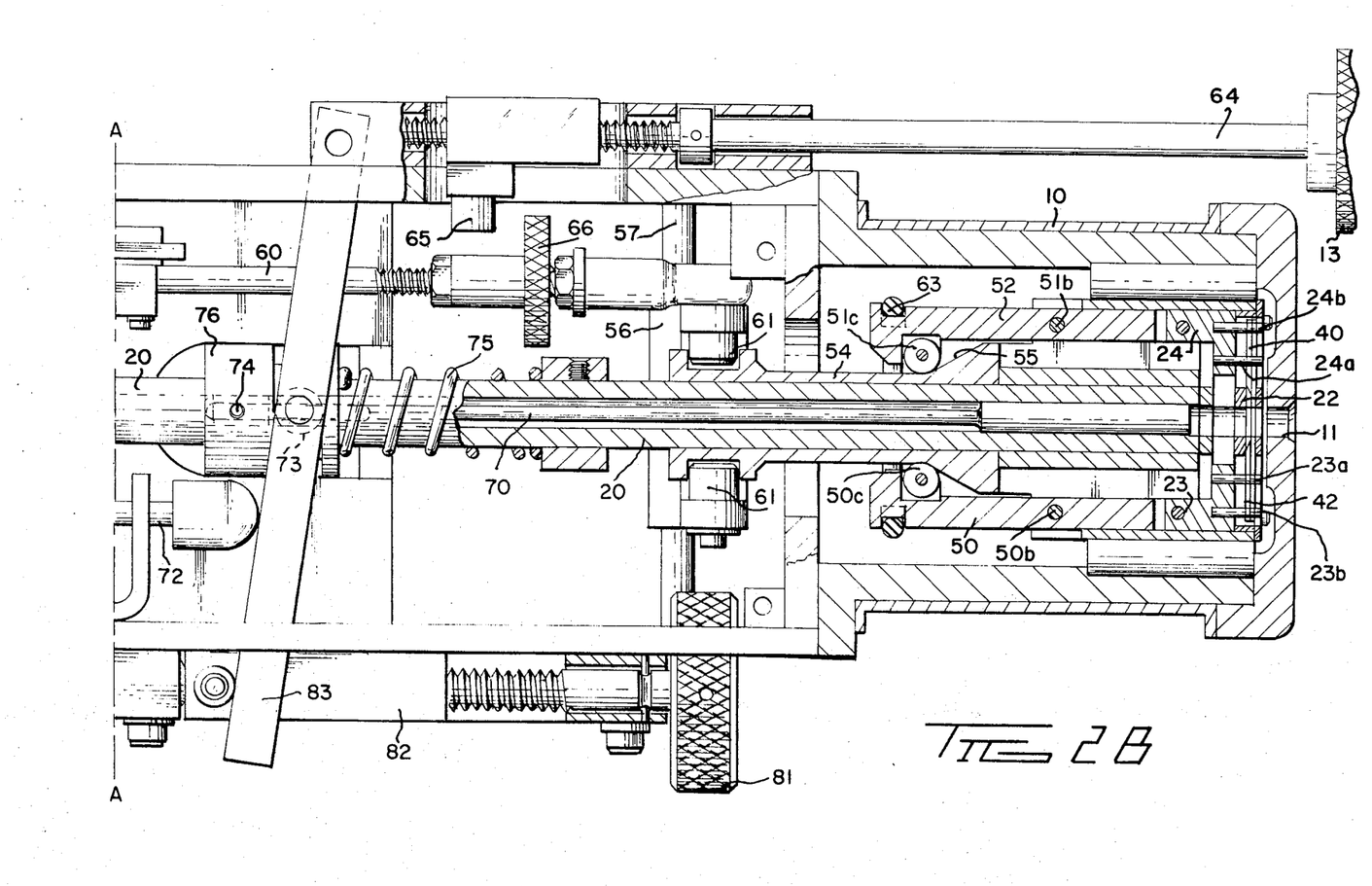
Figure 3:
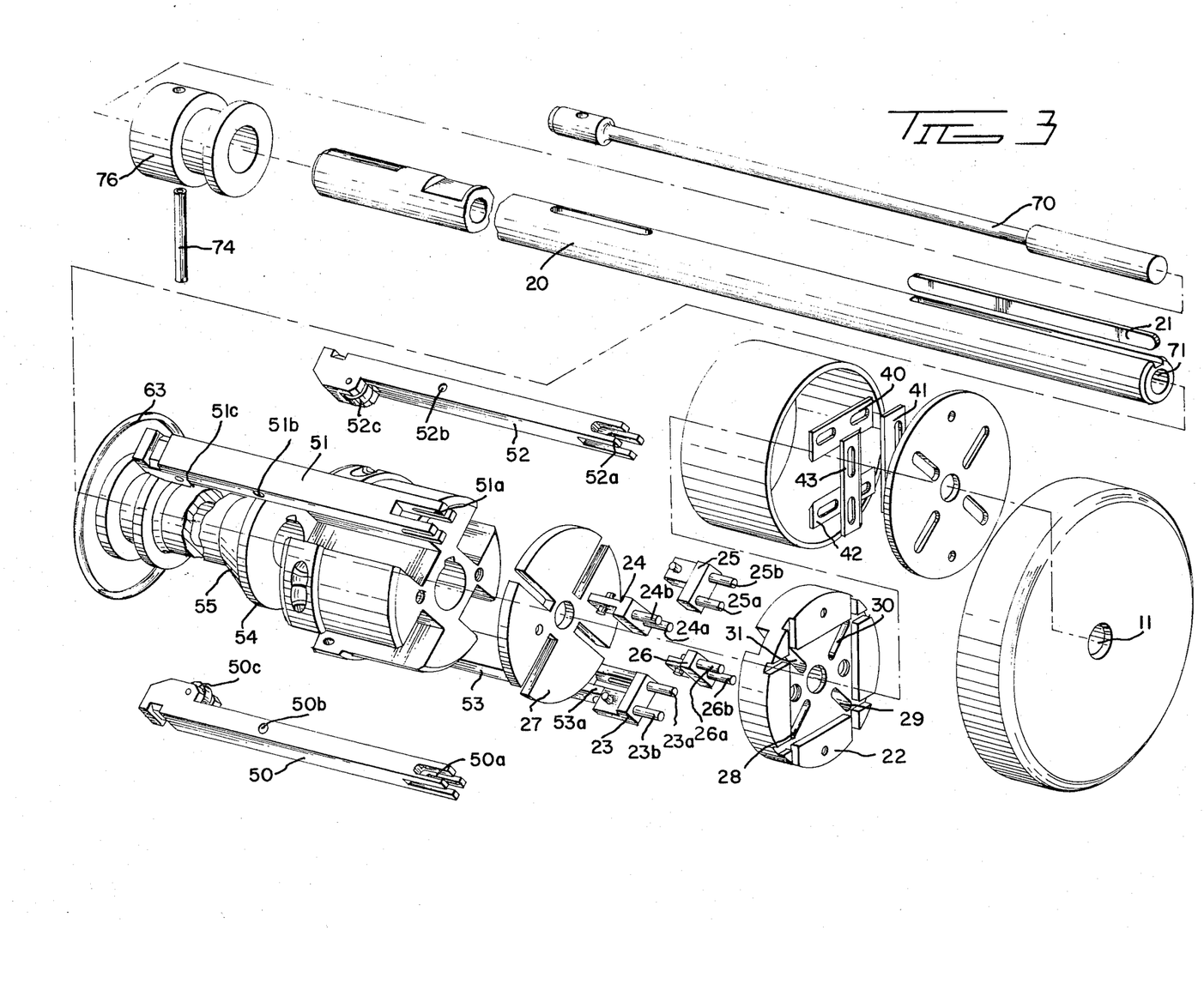
FIG. 3 is a perspective exploded view of the head and some of the actuating means of the mechanism of FIG. 1.
Figure 4:
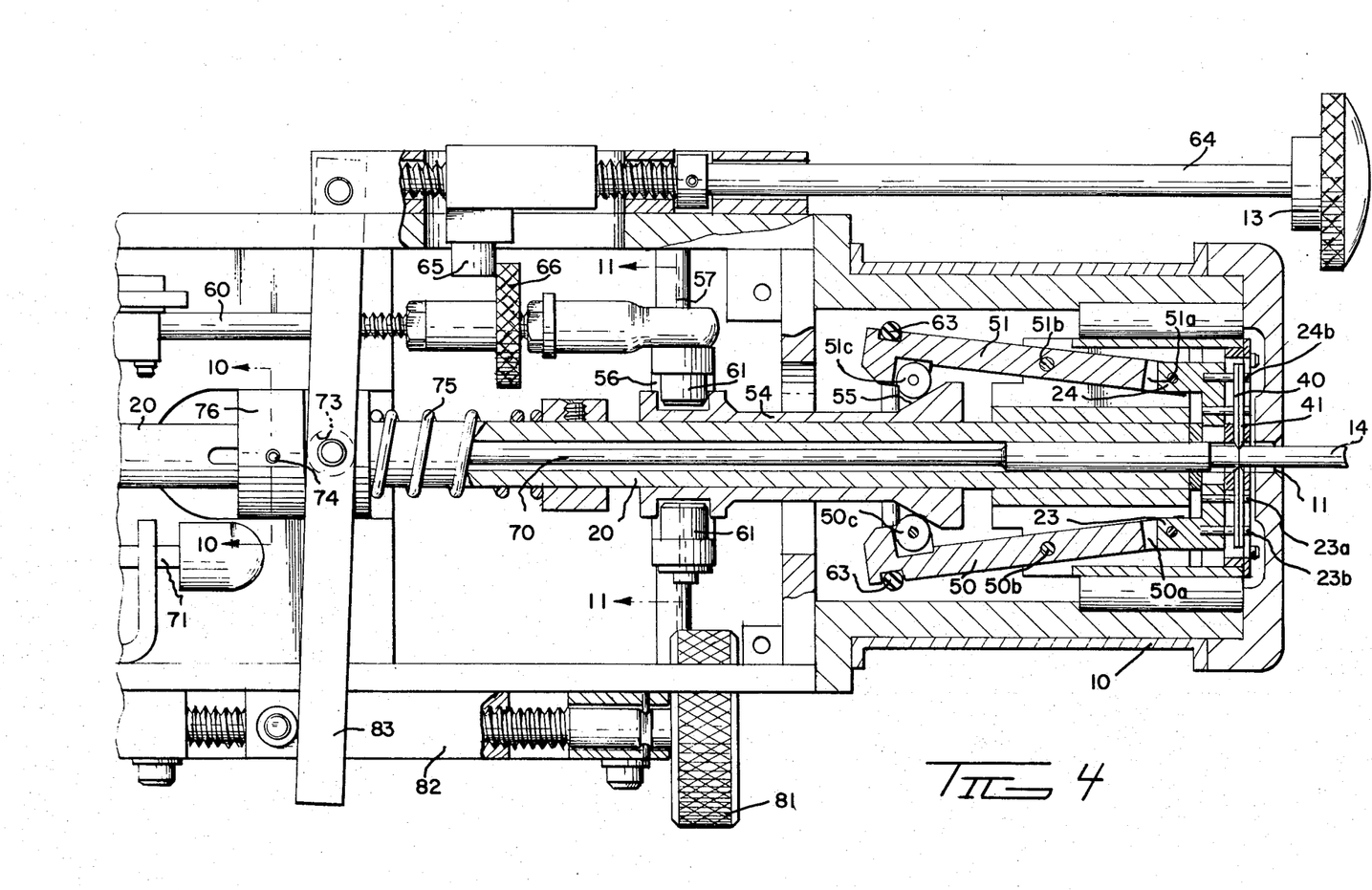
FIG. 4 is a view similar to FIG. 2B showing the mechanism after wire insertion.
Figure 5:
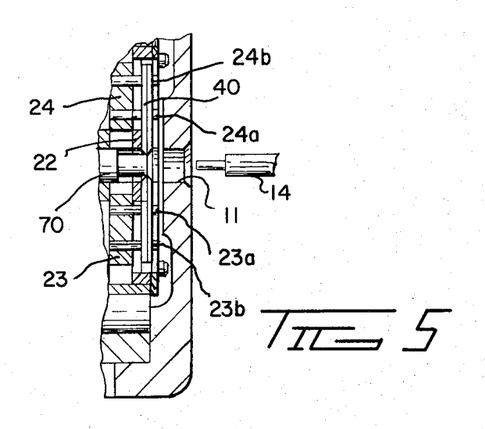
FIG. 5 is a fragmentary view of the end portion of the stripping head illustrating the wire removal.
Figure 6:
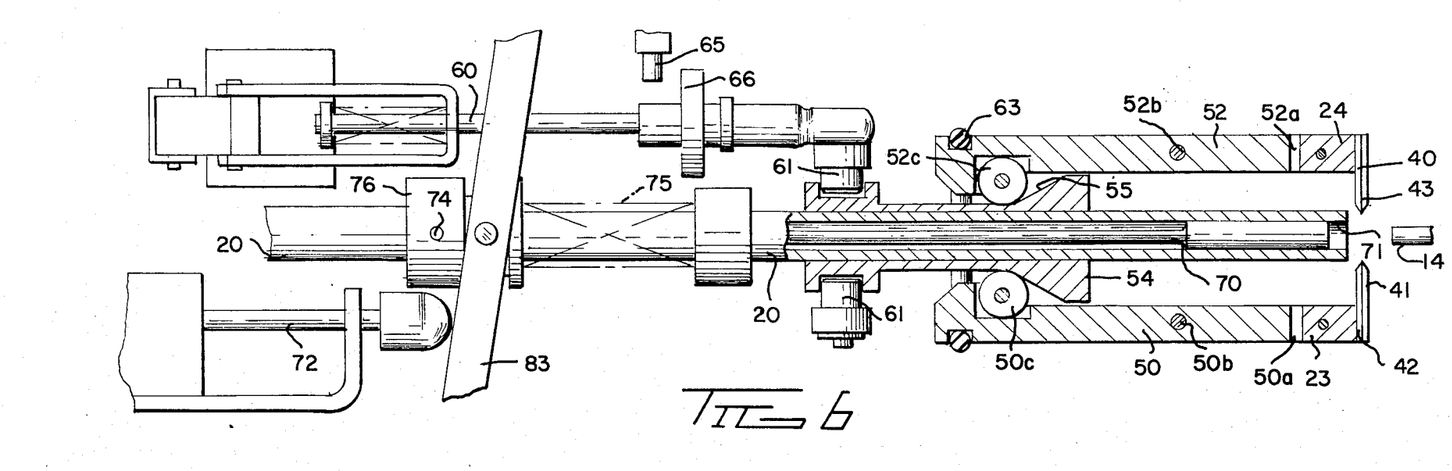
FIGS. 6, 7, 8 and 9 are fragmentary sectional views illustrating the subsequent operations of the stripping unit.

The operating assembly can be better understood from reference to FIGS. 2A, 2B and 3. The pulley 12 drives the main shaft 20. The key 21 (FIG. 3) locks the main shaft to the rotating blade assembly. The blade assembly includes a front cap 22, blade holders 23-26 and a wear plate 27. Each blade holder has two projections, i.e. the projections 23a-26a and the projections 23b-26b. The cap 22 includes the slots 28-31. The slots 28-31 are equiangularly spaced about the cap and extend in directions which are radial to the axis of rotation of the assembly. The projections of one of the blade holders 23-26 are disposed in each of the slots.

The assembly includes four blades 40-43 which are generally longitudinal in shape and have a cutting edge along one of the long sides. The cutting edges of the four blades form an iris for stripping the wire. That is, when the blade assembly is rotated, the blades form a circular opening which can be varied in size.

Figures 10, 11, 12, 13:
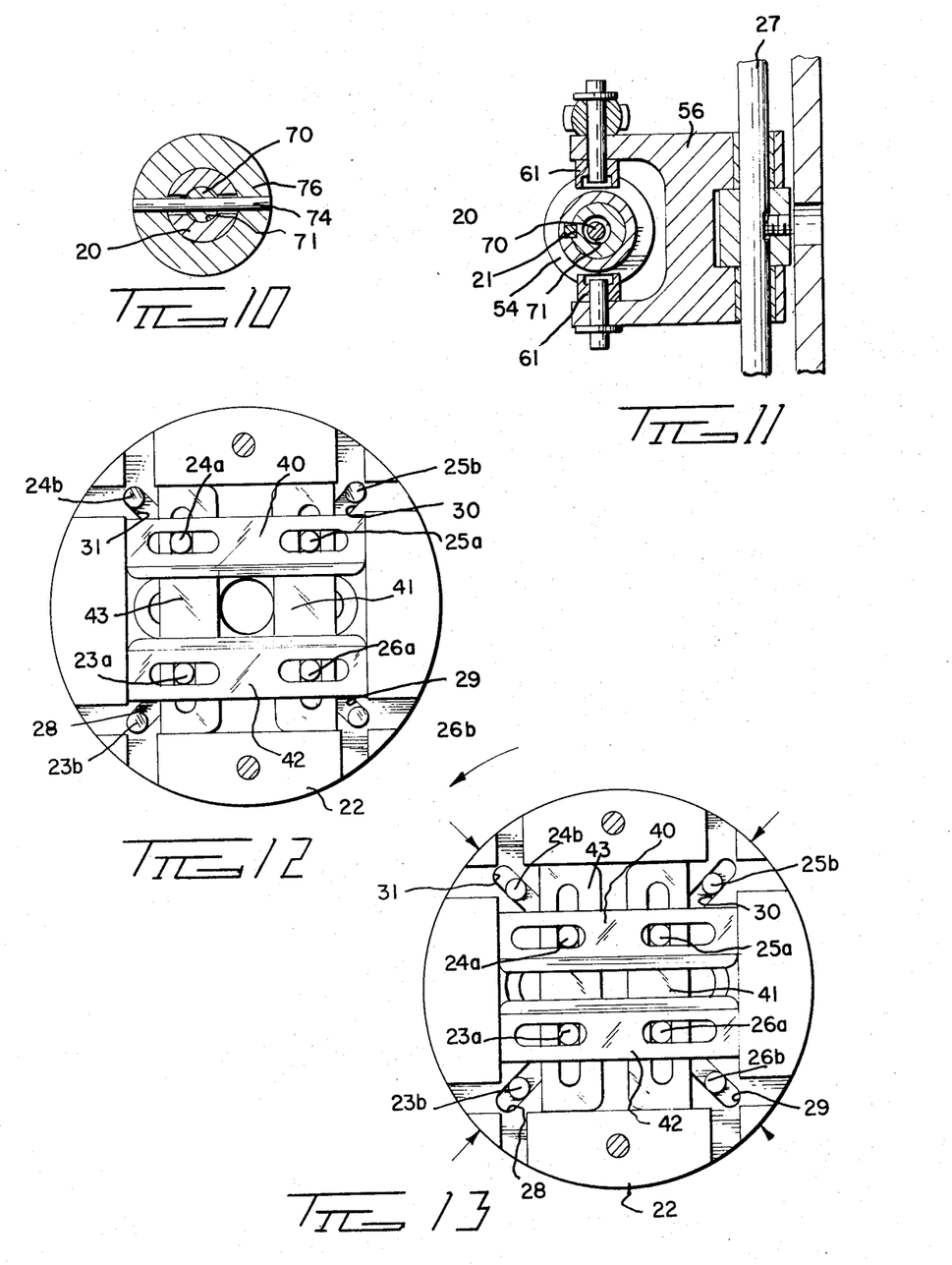
FIG. 10 is a view taken along the lines 10—10 of FIG. 4.
FIG. 11 is a view taken along the lines 11—11 of FIG. 4.
FIGS. 12 and 13 are front elevational views of the stripping blades in the open and closed positions.

Each of the blades 40-43 includes two apertures. One of the projections on each blade holder is disposed through the aperture of two blades. This is best seen in FIGS. 12 and 13. For example, the projection 24a is disposed in the apertures in the blades 40 and 43. The projection 25a is disposed in the aperture in the blades 40 and 41 and so on.

The blade holders 23-26 are driven inwardly and outwardly in the slots 28-31 so that the iris formed by the blades 40-43 is opened and closed. The means for driving the blade holders inwardly and outwardly in the slots in the cap 22 includes the operating levers 50-53. One end of each lever has bifurcated prongs 50a-53a for engaging an associated blade holder. Each of the levers is pivoted, as at the pivot points 50b-53b so that the one end of the lever is movable radially with respect to the axis of rotation of the assembly.

Figure 14:
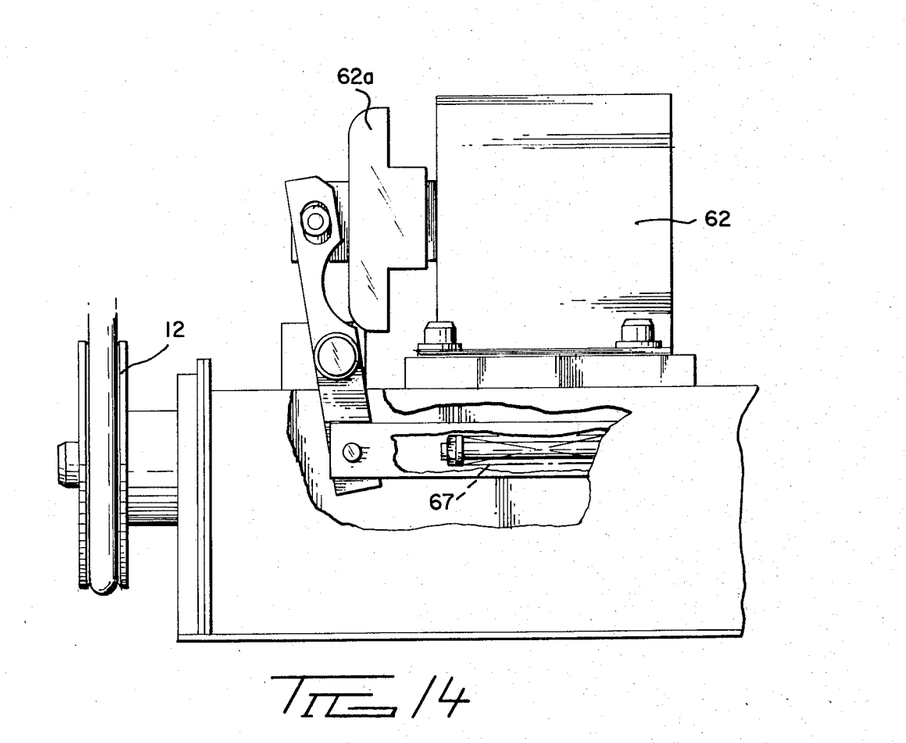
FIG. 14 is a view taken along the lines 14—14 of FIG. 2A.

The means for driving the operating levers inwardly and outwardly includes a cam member 54. The cam member 54 is slideably mounted on the main shaft 20. It has a cam surface 55 which increases in diameter along the axis of rotation of the assembly. The other ends, 50c-53c, of the operating levers are cam followers which engage the cam surface 55. The cam member 54 is moved in a direction along the axis of rotation of the assembly so that the cam followers 50c-53c ride up on the cam surface 55 to drive the blades 40-43 inwardly into cutting engagement with the insulation of the wire inserted in the iris. The means for moving the cam member 54 along the main shaft includes an operating shaft 60. The operating shaft 60 engages the cam member 54 through the follower 61. The main solenoid 62 (FIGS. 1 and 14) drives the operating shaft 60 in a direction along the main shaft so that the cam member 54 slides to the left. This causes the cam follower ends of the levers 50-53 to ride up on the cam surface 55 thereby driving the blades 40-43 inwardly. The operating arm 62a (FIG. 14) moves toward the right when the solenoid 62 is energized. Since solenoids of this type must be bottomed when they are operated, a biasing spring 67 is provided. The biasing spring 67 takes up the difference between the stop 65 (FIG. 2B) which prevents further movement of the shaft 60, and the bottoming of the solenoid. A flexible O-ring 63 is positioned around the other ends of each of the operating levers to bias the other ends inwardly. When the solenoid 62 is deenergized, the O-ring 63 returns the other ends of the operating levers downwardly on the cam surface to the position shown in FIG. 2B.

In order to set the diameter of the opening formed by the blades an adjustable stop is provided. A threaded screw 64 is rotated to adjust the blade opening for different sizes of wire. A movable stop 65 is movable to the left or right by the threaded screw 64. This adjustable stop 65 is engaged by the projection 66 on the operating shaft 60. The engagement of the projection 66 with the stop 65 limits the movement of the operating shaft 60 to the left. This determines how far up on the cam surface 55 the cam followers will ride. This in turn sets the opening of the blades.

When shaft 60 moves back toward the right, it triggers the microswitch 68 which fires the pusher-type solenoid 69. Pusher-type solenoid 69 operates the plunger 70 (FIG. 2B). The plunger 70 mounted in a bore 71 of the main shaft 20 expels the cutoff insulation after it has been stripped. The wire to be stripped is inserted into the bore 71 until it engages the plunger 70. The blades 40–43 form an iris at the opening of the bore. After the blades have cut the insulation, the wire has been pulled out of the bore to strip the insulation therefrom, the plunger 70 is driven to the right to expel the insulation from the bore.

The plunger 70 is operated by the pusher-type solenoid 69 in the following manner. The operating rod 72 of the solenoid drives the lever 83 to the right. The roller pin 73 extends through a slide 76 and rides in a clevis of the main shaft. This slide is pinned to the plunger 70 by the pin 74. When the solenoid 69 is energized the operating rod 72 acts through lever 83 to drive plunger 70 toward the right against the bias of the spring 75. The spring 75 returns the plunger to its rest position. The details of the manner in which the slide 71 is pinned to the plunger 70 are shown in FIG. 10.

The details of the way in which the followers 61 drive the cam member 54 are shown in FIG. 11. The followers 61 are positioned in a yoke 56 which is hinged on the pin 57.

Returning now to FIGS. 2A, 2B and 3, in order to adjust the length of insulation which is stripped from the wire, an adjusting knob 81 (FIG. 2B) adjusts the position of the plunger 70 in the bore. The block 82 is threadably engaged with the shaft on the knob 81. The block 82 moves to the left or to the right as the strip length is adjusted. The lever 83 mates with the block 82. The lever 83 is pinned to the spring-loading mechanism of the plunger 70. As the adjusting knob 81 is moved, the position of the plunger 70 in the bore of the main shaft is adjusted.

OPERATION

The operation of the machine can better be understood with reference to FIGS. 6–9. The wire 14 is inserted through the iris formed by the blades including the blades 40 and 42. The wire 14 abuts the end of the plunger 70. Then, the solenoid is energized to drive the operating shaft 60 to the left.

Figure 7:
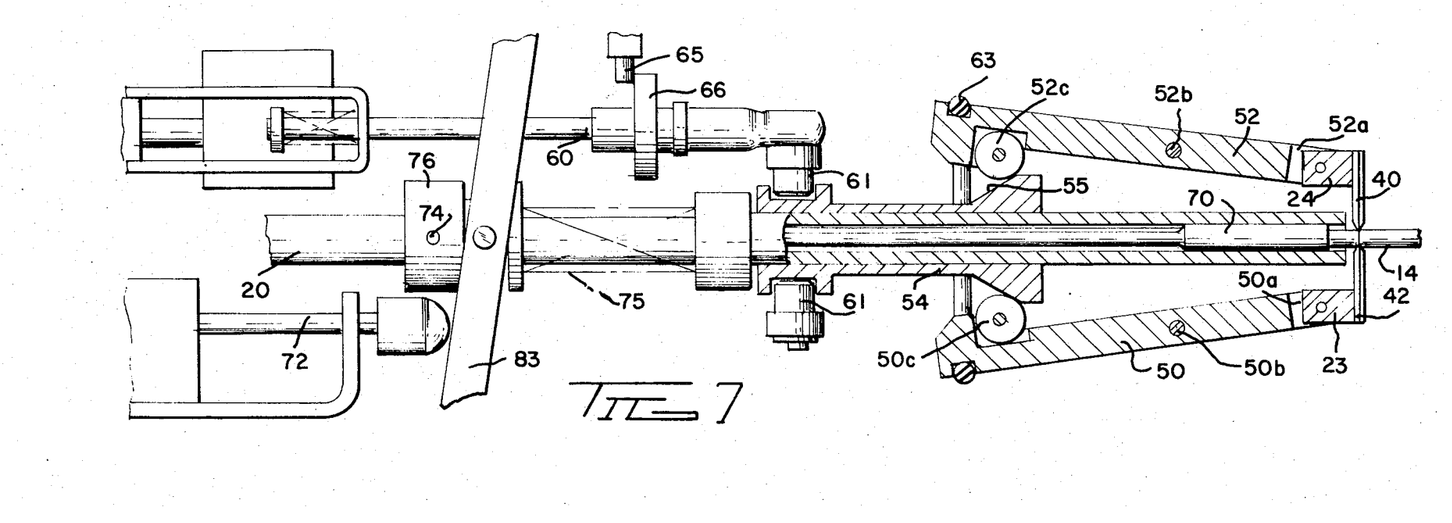

As shown in FIG. 7, the cam member 54 is driven to the left so that the ends 50c and 52c of the levers ride up on the cam surface. The distance that the ends of the levers ride up on the cam surface is determined by the engagement of the projection 66 with the stop 65. This in turn determines the cutting diameter of the blades.

Figure 8:
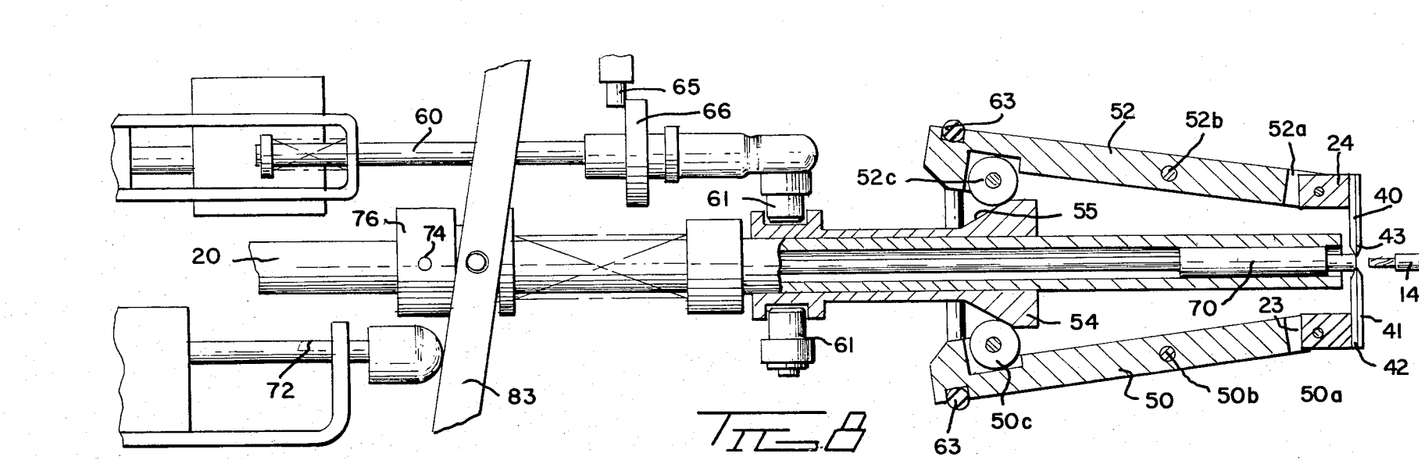

After cutting, the wire 14 is pulled from the machine to strip the end of the insulation as shown in FIG. 8. The slug 14a of insulation remains in the machine.

Figure 9:
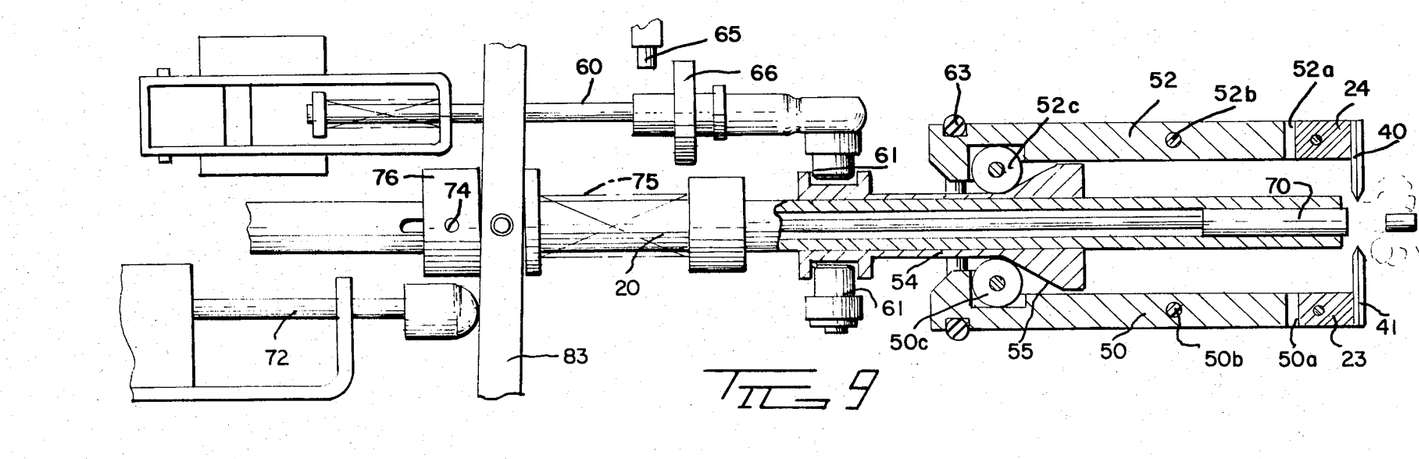

When the solenoid is released, the O-ring 63 draws the levers 50–53 inwardly to return them to the position shown in FIG. 9. Simultaneously, the spring-loaded plunger 70 is released to expel the slug 14a.

The movement of the blades inwardly and outwardly can best be seen with reference to FIGS. 12 and 13. As shown in FIG. 12, the levers are in the relaxed position. The opening formed by the blades is wide enough to permit the insertion of the wire. However, when the solenoid is operated the levers ride up on the cam member so that the projections 23a, 24a, 25a and 26a on the blade holders 23–26 drive the blades inward to form a smaller opening. This is the position shown in FIG. 13.

While a particular embodiment of the invention has been shown and described, it will, of course, be understood that various modifications may be made without departing from the principles of the invention. The appended claims are, therefore, intended to cover any such modification within the true spirit and scope of the invention.

What is claimed is:

1. In a wire-stripping machine of the rotary type in which a wire to be stripped is inserted into a continuously rotating assembly, an improved iris-type blade assembly comprising:
    a plurality of cutter blades each having two apertures therein,
    a cap having slots radial to the axis of rotation of said assembly and equiangularly spaced in said cap,
    a blade holder disposed in each of said slots,
    an aperture in two of said blades being positioned over each blade holder, and
    means for driving said blade holder inwardly and outwardly in said slots so that said blade holders open and close the iris formed by said blades.

2. The blade assembly recited in claim 1 including four blades each being generally longitudinal in shape and having a cutting edge along one side thereof, the cutting edges of said four blades forming an iris.

3. The blade assembly recited in claim 1 wherein said means for driving said blade holder comprises:
    an operating lever for each of said blades, one end of each lever engaging an associated blade holder, each lever being pivoted so that said one end is movable radially with respect to said axis of rotation, and
    means for driving said operating levers inwardly and outwardly to engage and disengage said blades with said wire.

4. The blade assembly recited in claim 3 wherein each of said levers is pivoted between the ends thereof and wherein said means for driving said operating levers comprises:
    a cam member having a cam surface increasing in diameter along said axis of rotation, said surface engaging the other end of each operating lever, and
    means for moving said cam member in a direction along said axis of rotation to engage and disengage said blades with said wire.

5. The blade assembly recited in claim 4 further including a main shaft for rotating said assembly and wherein said cam member is slideably mounted on said main shaft and wherein said means for moving said cam member includes:
    an operating shaft engaging said cam member and mounted parallel to said main shaft, and
    a solenoid for driving said operating shaft in a direction along said main shaft so that the other ends of each operating lever ride up on said cam surface to push said blades inwardly.

6. The blade assembly recited in claim 5 further comprising:
    a flexible O-ring positioned around the other ends of said operating levers to bias the other ends of said levers inwardly along to return said other ends after deenergization of said solenoid.

7. The blade assembly recited in claim 6 further comprising an adjustable stop to set the diameter of the iris formed by said blades, said adjustable stop being engaged by a projection on said operating shaft to limit the movement of said cam member.

8. The assembly recited in claim 5 and
    a spring-loaded plunger mounted in a bore in said main shaft, the wire to be stripped being inserted into said bore until it engages said plunger, said blades forming an iris at the opening of said bore, and
    means for releasing said spring-loaded plunger after said wire has been stripped to expel the insulation from said bore.

9. The wire assembly recited in claim 8 further comprising:
    means for adjusting the position of said plunger in said bore to set the length of insulation to be stripped from said wire.

* * * * *